United States Patent [19]

Syamal et al.

[11] Patent Number: 5,346,274

[45] Date of Patent: Sep. 13, 1994

[54] SPOILER TO REAR DECK LID ASSEMBLY

[75] Inventors: Pradip K. Syamal, West Bloomfield; Ronald A. Mueller, Rochester Hills, both of Mich.

[73] Assignee: General Motors Corporation, Detroit, Mich.

[21] Appl. No.: 92,101

[22] Filed: Jul. 16, 1993

[51] Int. Cl.5 .............................................. B62D 35/00
[52] U.S. Cl. .................... 296/180.1; 296/76
[58] Field of Search ................. 296/180.1, 180.2, 76, 296/146.8, 188; 180/903

[56] References Cited

U.S. PATENT DOCUMENTS

| | | | |
|---|---|---|---|
| 4,480,869 | 11/1984 | Splithoff | 296/217 |
| 4,558,898 | 12/1985 | Deaver | 296/180.1 |

FOREIGN PATENT DOCUMENTS

| | | | |
|---|---|---|---|
| 3803136 | 2/1989 | Fed. Rep. of Germany | 296/180.1 |
| 3923444 | 1/1991 | Fed. Rep. of Germany | 296/180.1 |
| 0190589 | 7/1989 | Japan | 296/180.1 |
| 0200581 | 8/1990 | Japan | 296/180.1 |

*Primary Examiner*—Dennis H. Pedder
*Attorney, Agent, or Firm*—Todd L. Moore; Jeffrey A. Sedlar

[57] ABSTRACT

A spoiler to rear deck lid assembly that absorbs energy from a rear impact while maintaining the connection of the spoiler to the rear deck lid of a vehicle. The spoiler utilizes rigid fasteners to connect the front portion of the spoiler to the rear deck lid and sliding fasteners to connect the rear portion of the spoiler to the rear deck lid. The rear deck lid also has a structurally weakened portion in the rear centermost portion of the spoiler so as to deform and absorb energy upon an initial impact of a rearward impact. The rear deck lid also has a structurally weakened portion between the rigid fasteners and the sliding fasteners so that the rear deck lid buckles upward from the rearward impact, thus absorbing energy and aiding in disconnecting the rigid fasteners from the rear deck lid.

8 Claims, 3 Drawing Sheets

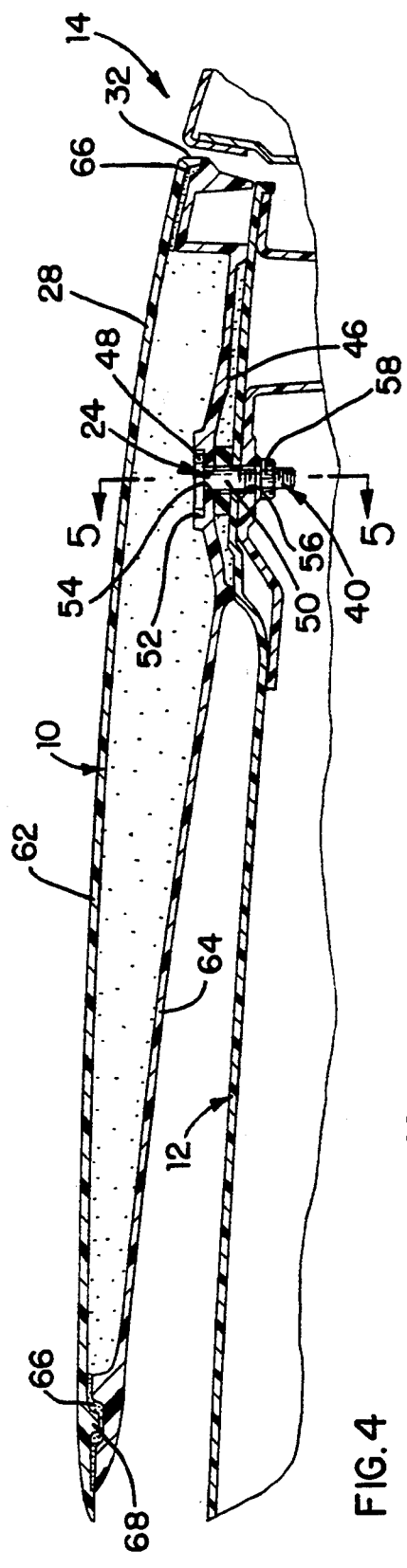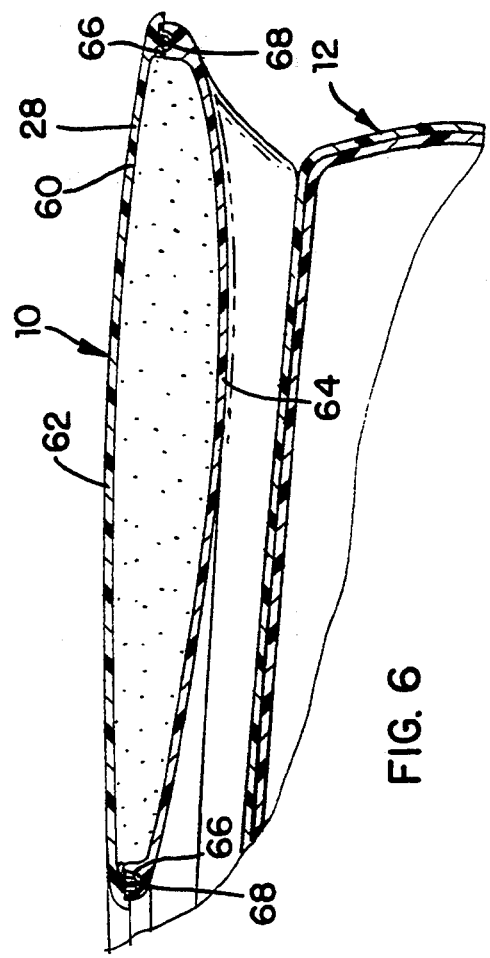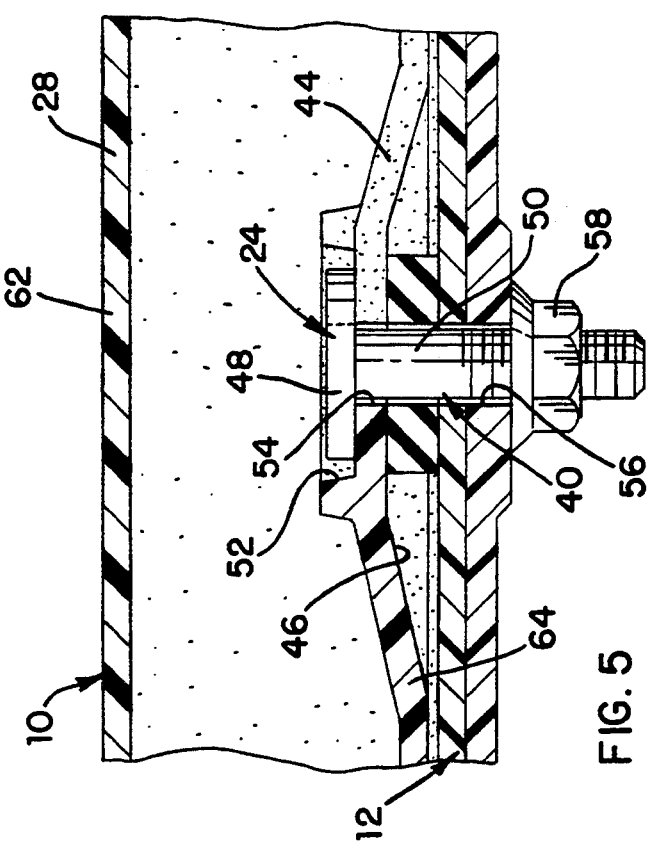
FIG. 4
FIG. 6
FIG. 5

SPOILER TO REAR DECK LID ASSEMBLY

The present invention relates generally to a spoiler to deck lid assembly of a vehicle and, more particularly, to a rear spoiler to rear deck lid assembly that absorbs energy upon a rearward impact without having the rear spoiler disconnect from the rear deck lid of the vehicle.

BACKGROUND OF THE INVENTION

Generally, a rear spoiler is rigidly connected to a rear deck lid or rear hatch of a motor vehicle. When the rear spoiler is mounted rearward of the rear deck lid, the rear spoiler may realize the initial impact of a rearward collision. When the rear spoiler is mounted parallel to or forward to the rear deck lid, the rear spoiler will realize the impact from a rearward collision upon the rear deck lid deforming and becoming parallel with the rear spoiler.

It is desirable to have a rear spoiler to rear deck lid assembly of a vehicle that absorbs energy from a rearward impact while maintaining the rear spoiler to rear deck lid connection throughout the rearward impact.

SUMMARY OF THE INVENTION

The present invention provides a rear spoiler to rear deck lid assembly of a vehicle that absorbs energy from a rearward impact while having the rear spoiler remain attached to the rear deck lid throughout the rearward impact by utilizing rigid fasteners in conjunction with sliding fasteners. Applicants have rigidly fastened the front portion of the rear spoiler to the rear deck lid and slidably connected the rear portion of the rear spoiler to the rear deck lid. The rigid fasteners are designed to disconnect from the rear deck lid upon the realization of a designed minimum load applied by the rearward impact. The slidable connection allows the spoiler to be moved relative to the deck lid by the rearward impact, while at the same time, maintaining the desired permanent connection between the spoiler and the deck lid.

In one form of the invention, the sliding fasteners utilize a T-bolt in a slot configuration wherein a friction fit is utilized which requires a designed minimum load, higher than the minimum load required to disconnect the rigid fasteners, before the sliding fasteners will slide. Once the rigid fasteners disconnect from the rear deck lid, the rear spoiler is allowed to slide across the sliding fasteners upon the realization of the required minimum load from the rearward impact. The sliding fasteners permanently maintain the connection between the rear spoiler and the rear deck lid so that the rear spoiler remains connected to the rear deck lid throughout the rearward impact.

In the preferred form, the rearward centermost portion of the rear spoiler is structurally weaker than the remaining portion of the rear spoiler, so that upon a rearward impact, the structurally weakened portion of the spoiler deforms to initially absorb energy from the rearward impact. This allows the rear spoiler to deform and become substantially parallel with the rear deck lid so that the rear deck lid can share in the absorption of energy from the rearward impact.

In one form of the invention, the rear deck lid has a portion beneath the spoiler that is structurally weaker than the remaining portion of the deck lid, and upon a rearward impact, the rear deck lid buckles upward at the structurally weakened portion. The upward buckling of the rear deck lid pushes upward on the rear spoiler thereby helping to apply the minimum force necessary to force the rigid fastener to disconnect from the rear deck lid.

In another form of the invention, the rear spoiler is comprised of an upper skin bonded to a lower skin to form a one piece rear spoiler. The front portion of the rear spoiler provides a greater bonding area than the rear portion of the rear spoiler. This assures that the two skins will not become detached at the front portion of the rear spoiler, but the two skins may become separated in the rearward portion of the rear spoiler so that they can absorb energy from a rearward impact. The bottom skin remains attached to the rear deck lid by the fasteners previously described.

To this end, the object of the present invention is to provide a new and improved rear spoiler to rear deck lid assembly of a vehicle that absorbs energy from a rearward impact while having the rear spoiler remain connected to the rear deck lid throughout the rearward impact.

BRIEF DESCRIPTION OF THE DRAWINGS

FIG. 4 is a section view in the direction of arrows 4—4 in FIG. 2 showing the sliding fastener slidably connecting the rear spoiler to the rear deck lid.

FIG. 5 is a section view in the direction of arrows 5—5 in FIG. 4 showing the sliding fastener assembly.

FIG. 6 is a section view in the direction of arrows 6—6 in FIG. 2 showing the two skins of the rear spoiler and showing the adhesive bonding along the peripheries of the two skins.

DETAILED DESCRIPTION OF THE PREFERRED EMBODIMENT

Figure 1:
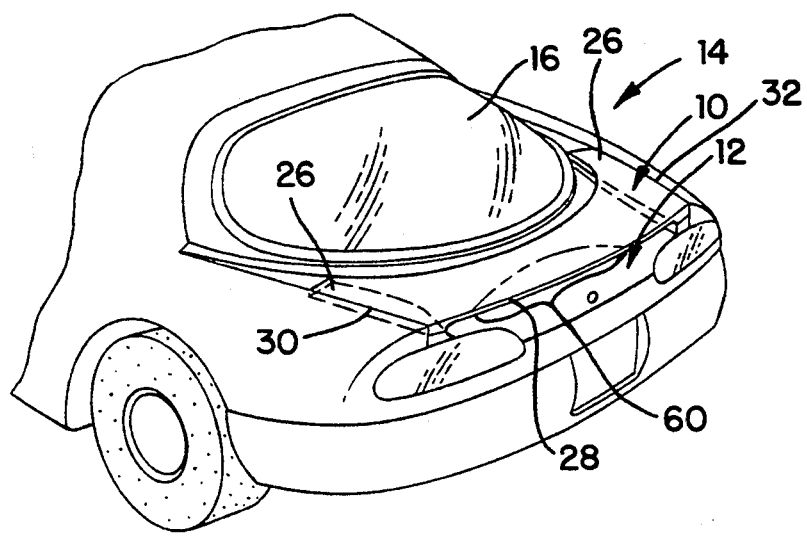
FIG. 1 is a perspective view showing a rear spoiler mounted to a rear deck lid of a vehicle.

Referring to the drawings, the present invention will now be described in detail with reference to the preferred embodiment.

FIG. 1 shows a rear spoiler 10 mounted to a rear deck lid or rear hatch 12 of a vehicle 14. Both the rear spoiler 16 and rear deck lid 12 are fabricated from a conventional fiberglass, but they may comprise any other materials having similar properties. The rear spoiler 10 is located just behind the rear glass 16 of the vehicle 14 and extends rearward of the rear deck lid 12. The present invention is not limited to having the rear spoiler 10 rearward of the rear deck lid 12, but rather, the rear spoiler 10 may be mounted parallel to or forward to the rear deck lid 12. The rear spoiler 10 aids in the motor vehicle's performance as well as providing an aesthetically pleasing design.

Figure 2:
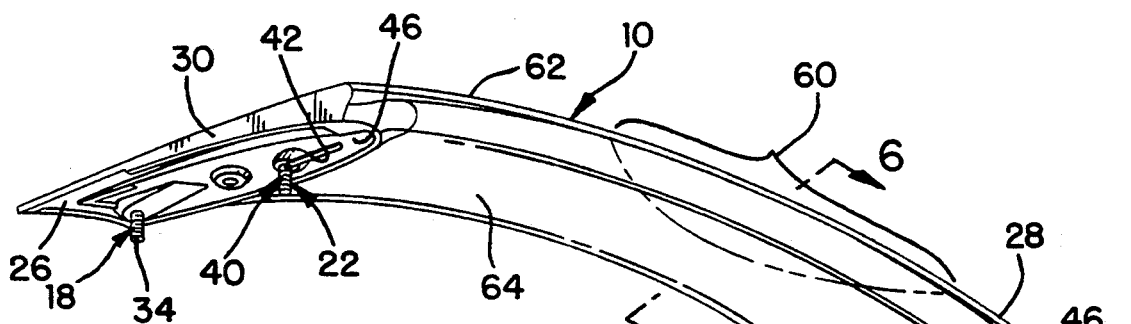
FIG. 2 is a perspective view showing the fasteners in the underside of the rear spoiler and showing in phantom line, a structurally weakened portion in the rearward centermost portion of the rear spoiler.

Due to the rear spoiler 10 extending rearward of the rear deck lid 12, the rear spoiler 10 realizes the initial impact of a rearward collision. If the rear spoiler 10 is mounted parallel to or forward to the rear deck lid 12, the rear spoiler 10 realizes the rearward impact upon the rear deck lid 12 deforming and becoming substantially parallel to the rear spoiler 10. For the rear spoiler 10 to absorb energy from the rearward impact, as well as remain connected to the rear deck lid 12 throughout the rearward impact, Applicants have utilized rigid fasteners 18, 20 and sliding fasteners 22, 24 to connect the rear spoiler 10 to the rear deck lid 12, as seen in FIG. 2. The rear spoiler 10 is U-shaped and has a front portion 26 extending towards the front of the vehicle 14 and a rear portion 28 extending toward the rear of the vehicle 14. The rear spoiler 10 is attached to the rear deck lid 12 by the two similar rigid fasteners 18, 20 located on opposite sides 30, 32, respectively, of the front portion 26 of the rear spoiler 10. The two similar sliding fasteners 22, 24 are utilized on opposite sides 30, 32, respectively, of the rear portion 28 of the rear spoiler 10.

Figure 3:
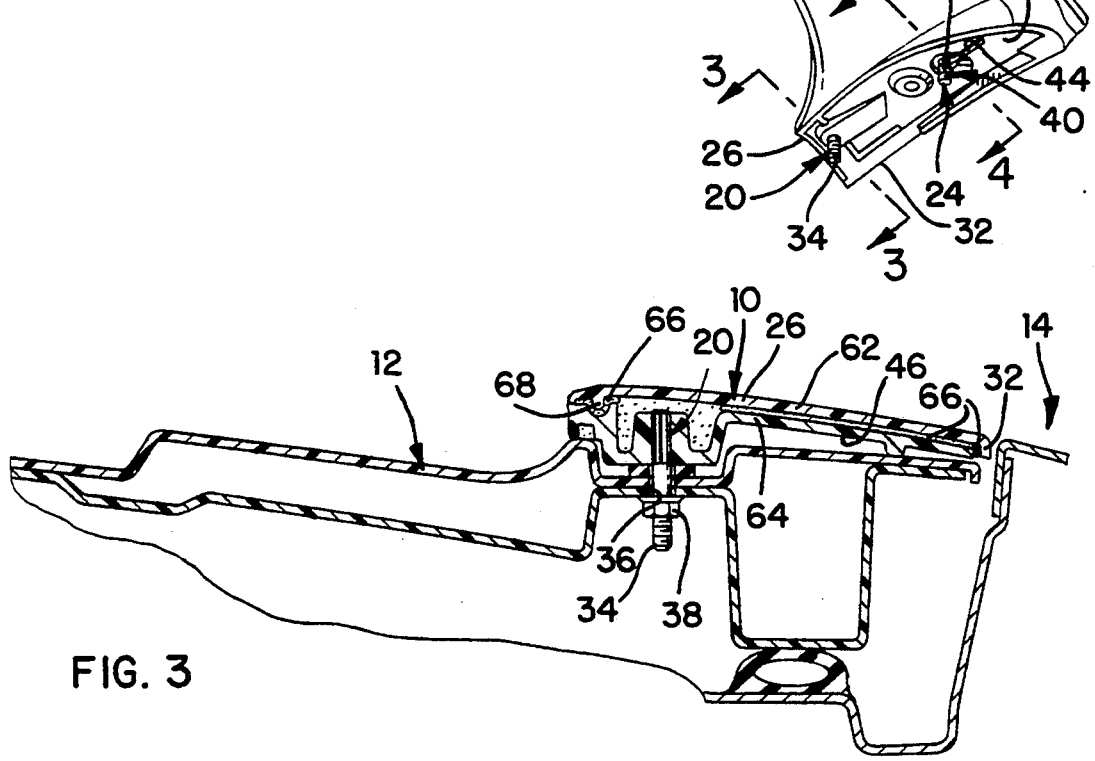
FIG. 3 is a section view in the direction of arrows 3—3 in FIG. 2 showing the rigid fastener connecting the frontward portion of the rear spoiler to the rear deck lid.

FIG. 3 shows one 20 of the pair of similar rigid fasteners 18, 20 connecting the front portion 26 of the rear spoiler 10 to the rear deck lid 12. The rigid fasteners 18, 20 comprise a threaded shaft 34 molded into the rear spoiler 10. The threaded shaft 34 extends through an aperture 36 in the rear deck lid 12 and is secured to the rear deck lid 12 through the use of a nut 38. The rear deck lid 12 is designed such that upon a designed minimum load, the rigid fasteners 18, 20 will disconnect from the rear deck lid 12 by having the nut 38 and threaded shaft 34 of the rigid fasteners 18, 20 pull through the rear deck lid 12. By having the rear deck lid 12 yield to the rigid fasteners 18, 20 upon a designed minimum load, a portion of the energy absorbed from the rearward impact is expended on the yielding of the rear deck lid 12.

To further absorb energy and maintain the connection of the rear spoiler 10 to the rear deck lid 12 throughout the rearward impact, the two similar sliding fasteners 22, 24 are provided in the rear portion 28 of the rear spoiler 10, as shown in FIGS. 4 and 5. The sliding fasteners 22, 24 comprise a T-bolt 40 that slides within slots 42, 44 provided in the underside 46 of the rear spoiler 10. The slots 42, 44 extend from the rear portion 28 towards the front portion 26 of the rear spoiler 10. The T-bolt 40 has a horizontal portion 48 and a vertical portion 50 wherein the horizontal portion 48 is captured in the cavity 52 of the slots 42, 44 by having the horizontal portion 48 larger than the opening 54 in the slots 42, 44. The vertical portion 50 of the T-bolt 40 is integral with the horizontal portion 48 and extends downward through the opening 54 of the slots 42, 44 through apertures 56 provided in the rear deck lid 12. The T-bolt 40 secures the rear spoiler 10 to the rear deck lid 12 by having a nut 58 thread onto a threaded portion of the vertical portion 50 of the T-bolt 40 from underneath the rear deck lid 12. The area of the rear deck lid 12 wherein the vertical portion 50 of the T-bolt 40 secures the rear spoiler 10 to the deck lid 12 is strengthened to assure that the T-bolt 40 will not be pulled through the deck lid 12 so that the rear spoiler 10 remains connected to the rear deck lid 12 throughout the rearward impact. A conventional washer (not shown) may be placed under the horizontal portion 48 of the T-bolt 40 to provide for added strength in the retention of the T-bolt 40 in the slots 42, 44.

The horizontal portion 48 of the T-bolt 40 is mounted in the forwardmost portion of the slots 42, 44 so that the rear spoiler 10 can slide forward relative to the stationary T-bolt 40 upon a rearward impact. The horizontal portion 48 of the T-bolt 40 has a friction fit with the cavity 52 of the slots 42, 44 so that a designed minimum load is required before the rear spoiler 10 can slide relative to the T-bolt 40. A portion of the energy transferred to the rear spoiler 10 from the rearward impact is expended on the force required to slide the rear spoiler 10 across the T-bolt 40.

In another preferred form, additional energy absorption is provided by having a structurally weakened portion 60 in the rearward centermost portion of the rear spoiler 10, as seen in phantom line of FIG. 2. The rearward centermost portion 60 of the rear spoiler 10 is commonly the first area of the rear spoiler 10 to initially realize a rear impact. The structurally weakened area 60 deforms upon a rearward impact thereby providing initial energy absorption from the rearward impact. Once the rear spoiler 10 deforms and becomes substantially parallel to the rear deck lid 12, the rear deck lid 12 can then assist in absorbing energy with the rear spoiler 10 by deforming with the rear spoiler 10.

In an additional preferred form, the rear deck lid 12 is designed to buckle upwards so as to aid the rear deck lid 12 in yielding to the rigid fasteners 18, 20 as well as aid in absorbing energy from the rearward impact. A structurally weakened portion 72 is provided in the deck lid 12 beneath the rear spoiler 10 and between the rigid fasteners 18, 20 and the sliding fasteners 22, 24 so that upon a rearward impact, the rear deck lid 12 buckles upward between the rigid fasteners 18, 20 and the sliding fasteners 22, 24. The buckling of the rear deck lid 12 absorbs energy from the rear impact and pushes the front portion 26 of the rear spoiler 10 upwards. The pushing of the rear spoiler 10 provides added force to disconnect the rigid connectors 18, 20 from the rear deck lid 12.

In a further preferred form, additional energy absorption and design flexibility are provided by having the rear spoiler 10 comprise of an upper skin 62 and a bottom skin 64 that are bonded together by a conventional adhesive 66, as seen in FIGS. 3-6. The two skins 62, 64 utilize a tongue in groove connection 68 around the perimeter of the two skins 62, 64. The adhesive bond 66 is applied to the tongue in groove area 68 as well as other areas wherein the two skins 62, 64 lie adjacent one another, as seen in FIGS. 3 and 4. A large amount of bonding adhesive 66 is applied to the front portion 26 of the rear spoiler 10. This assures the two skins 62, 64 will remain connected at the front portion 26 of the rear spoiler 10 while the skins 62, 64 are allowed to become disconnected at the rear portion 28 of the rear spoiler 10. The breaking of the adhesive bond 66 at the rear portion 28 of the rear spoiler 10 provides added absorption of energy from a rearward impact.

Figure 7A:
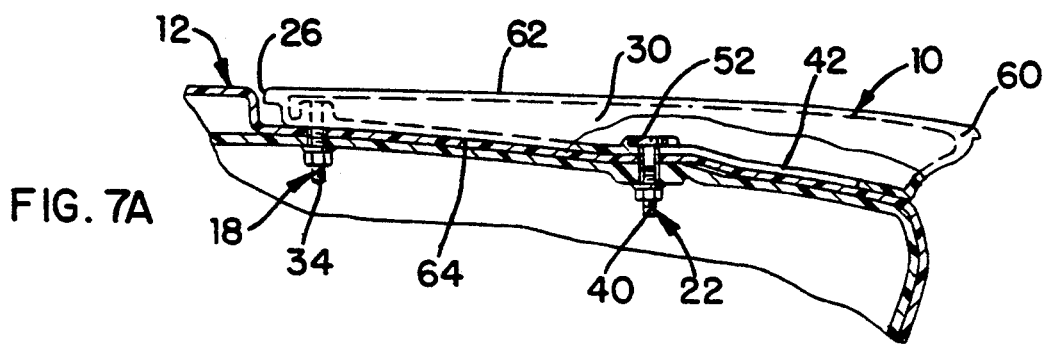
FIGS. 7A–7D are side elevation views showing the sequential effects of a rear impact load on a rear spoiler to rear deck lid assembly of a vehicle.
Figure 7B:
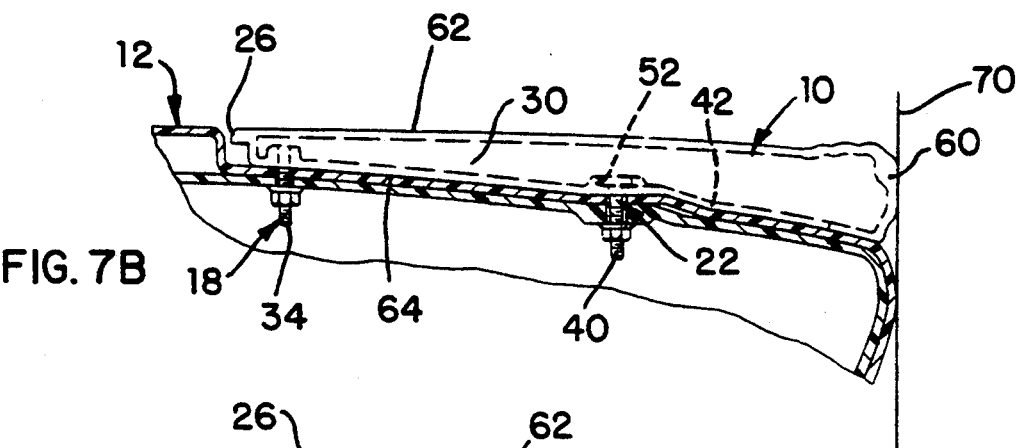
Figure 7C:
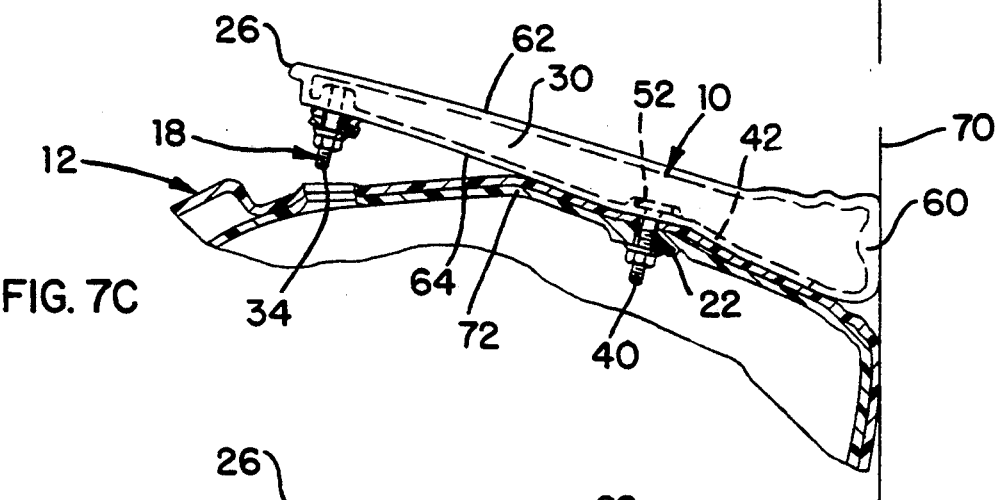
Figure 7D:
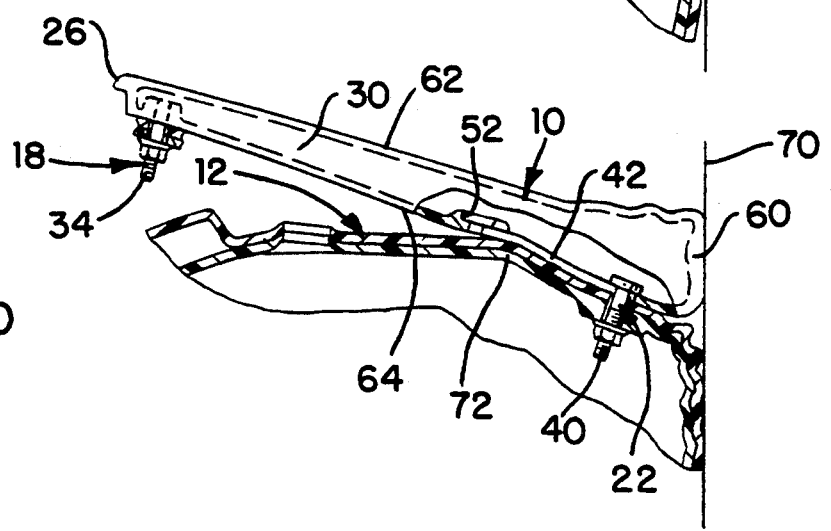

FIGS. 7A-7D show the sequential effect of how the rear spoiler 10 and rear deck lid 12 react upon a rearward impact. As seen in FIG. 7A, the rear spoiler 10 is connected atop the rear deck lid 12 and extends rearward past the rear deck lid 12. Upon a rear impact 70, represented by a vertical line 70 in FIG. 7B through 7D, the rear spoiler 10 deforms in the structurally weakened rearward, centermost portion 60 of the rear spoiler 10, as seen in FIG. 7B. The deformation of the structurally weakened portion 60 of the rear spoiler 10 is the first stage of absorbing the energy from the initial rear impact 70. Upon the rear impact 70 continuing forward into the rear deck lid 12, the rear deck lid 12 buckles upward at the structurally weakened area 72 between the rigid fasteners 18, 20 and the sliding fasteners 22, 24 of the rear deck lid 12, as seen in FIG. 7C. The upward buckling of the rear deck lid 12, in conjunction with the rearward impact 70 continually moving forward into the rear spoiler 10, causes the rigid fasteners 18, 20 to become disconnected from the rear deck lid 12 after a desired minimum load has been reached. Upon further forwarding of the rearward impact 70, the rear spoiler 10 slides forward relative to the T-bolt 40 upon a desired minimum load being ascertained, as seen in FIG. 7D. The three steps shown in FIGS. 7B-7D all provide absorption of energy from a rearward impact 70 while the T-bolt 40 ensures that the rear spoiler 10 remains connected to the rear deck lid 12, irregardless of the magnitude of the rear impact 70.

It should be noted that the invention is not limited to a rear spoiler comprised of a two piece design, but rather, any formulation of a rear spoiler may be utilized in conjunction with a rear deck lid. Thus, the rear spoiler to rear deck lid assembly provides a structure to absorb energy from a rearward impact while maintaining the attachment of the rear spoiler to the rear deck lid throughout the rearward impact.

The foregoing description is of a preferred embodiment of the invention, and it will be understood by those of ordinary skill in the art the various modifications and changes may be made without departing from the scope of the invention as defined in the claims.

The embodiments of the invention in which an exclusive property or privilege is claimed are defined as follows:

1. A spoiler to deck lid assembly of a vehicle that absorbs energy from a rearward impact and which maintains the connection between said spoiler and said deck lid throughout said rearward impact wherein said spoiler has a front portion and a rear portion, and said rear portion being farther towards the rear of said vehicle than said front portion, comprising:
   means for rigidly connecting said front portion of said spoiler to said deck lid;
   means for slidably connecting said rear portion of said spoiler to said deck lid permitting sliding movement only between a rearward and a forward position so that said slidable connecting means keeps said spoiler connected to said deck lid during said rearward impact irregardless of whether said rigid connecting means becomes disconnected from said rearward impact.

2. A spoiler to deck lid assembly of a vehicle that absorbs energy from a rearward impact and which maintains the connection between said spoiler and said deck lid throughout said rearward impact wherein said spoiler has a front portion and a rear portion, and said rear portion being farther towards the rear of said vehicle than said front portion, comprising:
   means for rigidly connecting said front portion of said spoiler to said rear deck lid, and said rigid connecting means detaching from said deck lid upon a first desired minimum load applied to said spoiler;
   means for slidably connecting said rear portion of said spoiler to said deck lid, and said slidable connecting means having a friction fit requiring a second desired minimum load applied to said spoiler for said slidable connecting means to slide; and
   said slidable connecting means sliding after said means for rigidly connecting disconnects from said deck lid due to a rear impact exceeding said first desired minimum load and after said slidable connecting means realizes a rear impact that exceeds said second desired minimum load so that said spoiler absorbs energy from said rear impact while remaining connected to said deck lid.

3. A spoiler to deck lid assembly as stated in claim 2, wherein said spoiler has opposite sides, and said means for rigidly connecting comprises:
   a pair of similar fasteners connecting said spoiler to said deck lid wherein one of said pair of similar fasteners is connected to each of said opposite sides of said spoiler and said deck lid and said pair of similar fasteners disconnecting from said deck lid upon said first minimum load being applied to said spoiler.

4. A spoiler to deck lid assembly as stated in claim 2, wherein said spoiler has opposite sides and said slidable connecting means comprises:
   said spoiler having a slot in each of said opposite sides, and said slots extending from said rear portion toward said front portion of said spoiler;
   a second pair of similar fasteners each having a horizontal portion slidably engaging each of said slots and each having a vertical portion connecting said opposite sides of said spoiler to said deck lid; and
   said horizontal portion of said second pair of similar fasteners having a friction fit within said slots so that said spoiler must realize a second minimum load before said spoiler slides across said horizontal portion of said second pair of similar fasteners.

5. A spoiler to deck lid assembly of a vehicle that absorbs energy upon receiving a rearward impact and which maintains the connection between said spoiler and said deck lid throughout said rearward impact wherein said spoiler has opposite sides, a front portion and a rear portion wherein said rear portion is farther towards the rear of said vehicle than said front portion comprising:
   a first pair of similar fasteners connecting said front portion of each of said opposite sides of said spoiler to said deck lid, and said first pair of similar fasteners disconnecting from said deck lid upon said spoiler realizing a first desired minimum load from a rearward impact;
   said spoiler having a pair of similar slots extending along said opposite sides of said spoiler from said rear portion of said spoiler towards said front portion of said spoiler;
   a second pair of fasteners slidably connecting said spoiler to said deck lid wherein said second pair of fasteners slidably engage each of said slots in the forwardmost portion of said slots, and said second pair of fasteners having a friction fit with said slots so that after said first pair of similar fasteners disconnect from said deck lid due to a rearward impact exceeding said first desired minimum load, said spoiler will slide along said second pair of similar fasteners upon a second desired minimum load being realized from a rearward impact.

6. A spoiler to deck lid assembly as stated in claim 5, including a weakened portion in the centermost portion of said rear portion of said spoiler, and said weakened portion deforming and absorbing energy from said spoiler receiving a rearward impact.

7. A spoiler to deck lid assembly as stated in claim 5, including said deck lid having a weakened portion beneath said spoiler between said first and said second pair of fasteners so that said weakened portion of said rear deck lid buckles upward upon said rear deck lid receiving a rearward impact, and said buckling deck lid pushing said spoiler upward and forcing said first pair of fasteners to disconnect by providing the first designed minimum load from said rear deck lid.

8. A spoiler to rear deck lid assembly of a vehicle that absorbs energy upon receiving a rearward impact and which maintains the connection between said spoiler and said rear deck lid throughout said rearward impact wherein said spoiler has a periphery, opposite sides, a front portion and a rear portion wherein said rear portion is farther towards the rear of said vehicle than said front portion comprising:

said spoiler having a top skin and a bottom skin, and said top skin and said bottom skin being adhesively connected about said periphery of said spoiler, and said adhesive connection being stronger at said front portion of said spoiler than said rear portion of said spoiler to allow said weaker rear portion adhesive connection to break and expend energy, and said top skin and said bottom skin having a weakened material portion in the centermost portion of said rear portion of said spoiler so that said weakened material portion will deform and expend energy from a rearward impact;

a first pair of similar fasteners rigidly connecting said front portion of each of said opposite sides of said bottom skin of said spoiler to said rear deck lid, and said first pair of fasteners disconnecting from said rear deck lid upon said spoiler realizing a first minimum load from a rearward impact;

said bottom skin of said spoiler having a pair of similar slots extending along said opposite sides of said bottom skin of said spoiler from said rear portion of said spoiler towards said front portion of said spoiler and said slots having a cavity and an opening in said slot;

a second pair of fasteners slidably connecting said spoiler to said rear deck lid and said second pair of fasteners having a T-shaped cross section wherein the vertical portion of said T-shaped cross section extends through said opening in said slot and is rigidly connected to said rear deck lid, and the horizontal portion of said T-shaped cross section of said second pair of fasteners is seated and captured in said cavity of said T-shaped cross section, and said horizontal portion having a friction fit with said cavity so that said spoiler must receive a second designed minimum load from a rearward impact before said spoiler can slide across said second pair of fasteners; and said rear deck lid having a weakened portion between said first and said second pairs of fasteners so that sad rear deck lid buckles upward at said weakened portion upon said rear deck lid receiving a rearward impact, and said upward buckling of said rear deck pushing upward on said spoiler and forcing said first pair of fasteners to disconnect from said rear deck lid by providing the first designed minimum load and allowing said spoiler to slide across said second pair of fasteners towards the front of said vehicle upon said spoiler receiving a rearward impact that exceeds said second minimum load.

* * * * *